March 23, 1965 A. WOLINSKY 3,175,210

ANALOG TO DIGITAL CONVERTER

Filed April 7, 1959

INVENTOR.
ALBERT WOLINSKY

BY H. A. Mackey

ATTORNEY.

United States Patent Office 3,175,210

Patented Mar. 23, 1965

3,175,210

ANALOG TO DIGITAL CONVERTER

Albert Wolinsky, New Rochelle, N.Y., assignor to General Precision, Inc., a corporation of Delaware Filed Apr. 7, 1959, Ser. No. 804,661
2 Claims. (Cl. 340—347)

This invention relates to devices for converting analog data to the digital form and particularly for converting mechanical displacement data to electrical digtal signals representative thereof.

The invention provides a simplified code device, such as a code wheel or cylinder, together with sensing and readout elements. The input consists of a mechanical displacement, typically the angular displacement of a shaft, which by its magnitude represents a datum value. The output consists of multiple electrical signals representing the several digits of a numeral representing the input datum value.

A code device consists typically of a disc having inscribed on one surface concentric zones, each zone containing alternating areas, of equal lengths, and of two kinds. These two kinds may be of different colors, different electrical conductivities, or otherwise distinguishable by sensing elements, one or more of which are associated with each zone. Signals perceived by the sensing elements are translated by accessory apparatus to multiple digital signals.

The instant device, by adding sensing elements in a higher zone of the code device, senses and signals the code patterns of all of the lower zones, and by suitable accessory apparatus these multiple digital signals are produced as if actually generated by sensing of the lower zones. Thus, all of the lower zones of the code device may be dispensed with, and the code device can be greatly simplified. The method and apparatus by which this invention is carried out thus offer the added advantage of providing unambiguous readout of all zones simulated.

In the application of this invention to an existing code device inscribed with either the natural or the cyclic binary code, by the addition of any desired number of sensing devices and associated accessory apparatus to the least significant zone, the code device can be made to behave as if it had a desired number of additional zones decreasingly less significant than the physically present least significant zone. These added zones may be termed hypothetical zones. They are limited in number only by space limitations on placement of additional sensing devices on the code device. By addition of these hypothetical zones, the digital number is extended to the right by the same number of digital places, and the resolution of its value is increased by the same number.

In a second application of this invention, any existing code device may be replaced by a code device having a single zone equal in angular measure and in code pattern to the most significant zone of the replaced code device. Thus, for example, a seven-zone code disc may be modified by removal of the six less significant zones, leaving only the most significant zone having, for example, a black segment of 180° and a white segment of 180°. By application to this greatly simplified code wheel of additional sensing devices and accessory apparatus, the physically present zone and the six hypothetical zones may all be read out and digital signals generated as well as from the original seven-zone code wheel.

One purpose of this device is to provide an analog-to-digital converter including a simplified code device.

Another purpose of this invention is to provide a code device, sensing devices, and accessory devices for converting analog data to digital data signals, including signals representing digits less significant than that of the least significant zone actually present on the code device.

A further understanding of this invention may be secured from the detailed description and associated drawings, in which.

Figure 1:
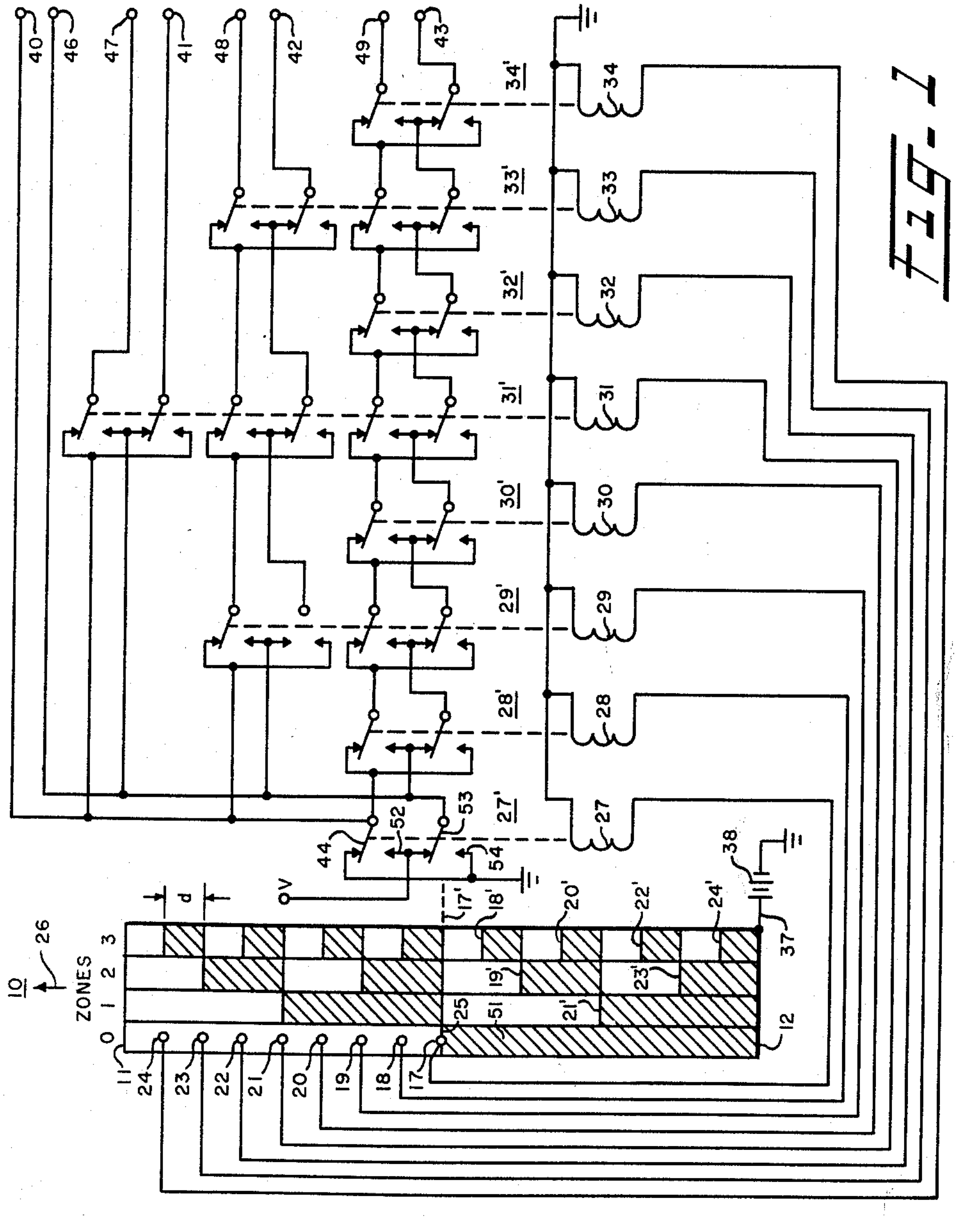
FIGURE 1 depicts a pattern representing the natural binary digital code together with a schematic relay circuit for converting signals from a code device so patterned to output signals representing binary numbers.
Figure 2:
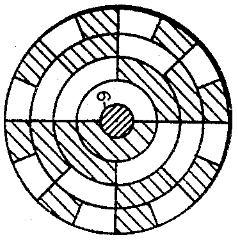
FIGURE 2 depicts a code disc inscribed with the natural binary code pattern.

Referring now to FIG. 1, a pattern 10 representing a 4-digit natural binary code is selected for illustration. This pattern is arranged so that it may be wrapped around a rotatable cylinder, with its top edge 11 and bottom edge 12 falling on the same line to form a code cylinder. Alternatively, a similar pattern may be arranged on a rotatable disc, as shown in FIG. 2, to form a code disc secured to a shaft 9. In these patterns, the white areas represent the zeros of the natural binary code and the dark or cross-hatched areas represent the unit digits. In a code device carrying this pattern, the white and dark areas can be sensed by optical means such as photosensitive elements, or insulating and conducting areas can be employed in place of the light and dark areas, with electrical devices such as brushes to sense them or distinguish between them. In the pattern 10 of FIG. 1, and on code discs and cylinders carrying this or another digital pattern, the longitudinal zones of alternating areas are identified as zone 0, the most significant zone, and as zones 1, 2, and 3 in order of lesser significance, zone 3 being the last significant zone.

In order to sense the four zones, eight sensing devices are employed at the eight positions along zone 0 shown by the eight small circles 17, 18, 19, 20, 21, 22, 23, and 24. These sensing devices or pickups are positioned in a fixed frame, not shown, and are fixed relative to each other. The act of sensing by a pickup of the positioning of zone 0 consists of sensing whether the areas as depicted at the pickup is light or dark (cross-hatched) as might, for example, be done by a phototube.

The movement of the cylinder bearing the pattern 10 relative to the pickups is indicated by the arrow 26. The forward direction of motion of the cylinder is defined as that direction in which the binary numbers sensed by the pickups increase in value. This forward direction of motion of the pattern relative to the pickups is shown by the direction in which arrow 26 points. The positions of the pickups on the cylinder pattern as depicted in FIG. 1 represent a particular time or phase in the rotation of the cylinder relative to the pickups. These positions as depicted for the purpose of illustration are with the pickup 17 at the transition of boundary 25 of the zone 0 pattern, and with all other pickups on the light rectangle of the zone.

Since all pickups are positioned on or adjacent to zone 0 and there are no pickups positioned for direct sensing of zones 1, 2, and 3, these three zones may be eliminated. The base zone, zone 0, may be thought of either as the only tangible or physical zone of a 4-zone device, the other three zones being merely hypothetical or theoretical, or as the least significant zone of a code device the zones of higher significance or which exist but are not depicted in the figure. In either case, the described arrangement constitutes a suitable example, and in either case, the associated devices, here relays, and the description of operation are the same.

The positions of the pickups are longitudinally spaced along zone 0 as shown, at equal intervals of length *d*, the length of one dark or light rectangle of zone 3. This spacing is explained as follows. Let it be assumed that the code pattern is moving upward, in the direction of arrow 26, relative to the eight pickups. In the position depicted, the pickup 17 is at the point of sensing transition 25. As transition 25 moves upward, it arrives, after moving the distance *d*, at pickup 18, which then senses its presence. But at this position of the code device, the transition 18′ of zone 3 is abreast of pickup 17 so that, if there were a transverse line of pickups at pickup 17, the pickup in zone 3 would sense transition 18′. Therefore, pickup 18 performs the function which an imaginary pickup would perform in sensing transition 18′ at a transverse measuring line 17′ through pickup 17.

In the same way, pickup 19 is placed at a distance 2*d* above the line 17′ through pickup 17, equal to the distance 2*d* by which transition 19′ of zones 2 and 3 is below transition 25. Pickup 20 is a distance 3*d* above line 17′ while transition 20′ is the same distance below transition 25. Also, pickups 21, 22, 23, and 24 are at the same distances on one side of the imaginary measuring line 17′ as the transitions 21′, 22′, 23′, and 24′ are on the other side of transition 25.

Thus, the eight pickups 17 to 24, all in the same zone, together perform all of the functions that four pickups arranged in a single transverse line, one in each zone, would perform. Moreover, the eight pickups have the advantage of unambiguous readout while the four transverse pickups may give ambiguous readouts.

Each of the pickups 17 to 24 has as its function the emitting of either of two kinds of signals representing the two kinds of pattern beneath it. If, for example, the pickup is an electrical brush and the surface is either insulating, corresponding to the light areas as depicted, or conducting, corresponding to the dark areas, the pickup in a suitable circuit including a potential source would indicate a conducting surface by current flow and an insulating surface by absence of current flow. The associated readout equipment selected as example is for use with such a code device and such pickups, with all conducting segments of the code device electrically connected together and to a source of potential.

The circuit of this associated equipment includes eight relay windings 27, 28, 29, 30, 31, 32, 33, and 34 respectively connected to the pickups 17 to 24. The eight windings are grounded through the common conductor 36. All of the conductive (cross-hatched) rectangles of the code cylinder 10 are connected together and through a conductor 37 to a source of direct potential 38, represented as a grounded battery. Each relay has from two to six contact arms. A potential V is applied to two contacts of the relay 27′, and output conductors are connected to contacts of relays 27′, 31′, 33′, and 34′. Four output terminals 40, 41, 42, and 43 are provided. Output terminal 40 is connected to contact arm 44 of relay 27′. The function of this terminal is to represent by potential levels of zero or V the light or dark segments of zone 0. Similarly, the potential levels of terminals 41, 42, and 43 represent the light or dark segments of zones 1, 2, and 3, respectively.

The terminals 46, 47, 48, and 49 carry potential levels which are always different from those of terminals 40, 41, 42, and 43, so that the outputs of terminals 46, 47, 48, and 49 constitute signals which are the complements of the outputs of terminals 40, 41, 42, and 43, respectively.

In operation, let it be supposed that the code device is as depicted in FIG. 2, having the pattern depicted thereon as developed in FIG. 1, and having sensing elements or pickups 17 to 24, with the associated equipment including electromagnetic relays and the circuit of FIG. 1. At zero angular deflection of shaft 9, pickup 17 senses the conducting segment 51 of zone 0. Current flows from battery 38 through relay winding 27 and its contact arms operate. Potential V is applied through contact 52 and arm 44 to terminal 40. Terminal 41 is connected through contact arm 53 to contact 54, which is blank or grounded, so that terminal 41 potential is at zero or ground. Similarly, terminal 42 is connected through contact arm 53 and contact 54 to ground, as is also terminal 43. Thus, the potentials of terminals 40, 41, 42, and 43 represent the binary digits 1000 having the value, in decimal notation, of 8.

At the same time the complementary output terminals 46, 47, 48, and 49 are given the potentials 0, V, V, and V, representing the complementary digits 0111 having the value, in decimal notation, of 7, which is the complement of 8 in the four-digit binary code.

As the code pattern moves forward, the conducting segment 51 is picked up by one pickup after another from 17 to 24 in order, operating relays 27′ to 34′ in the same order and keeping them operated. At the operation of each relay, potentials on one or more of the output terminals 40, 41, 42, and 43 are changed so as to represent the consecutive binary numbers in accordance with the following table:

| Conducting Segment 51 | | Resulting Potentials on Terminal No. | | | | Output of Binary Number | Value in Decimal Notation |
|---|---|---|---|---|---|---|---|
| Engages pickup | Leaves Pickup | 40 | 41 | 42 | 43 | | |
| 17 | -------- | V | 0 | 0 | 0 | 1000 | 8 |
| 18 | -------- | V | 0 | 0 | V | 1001 | 9 |
| 19 | -------- | V | 0 | V | 0 | 1010 | 10 |
| 20 | -------- | V | 0 | V | V | 1011 | 11 |
| 21 | -------- | V | V | 0 | 0 | 1100 | 12 |
| 22 | -------- | V | V | 0 | V | 1101 | 13 |
| 23 | -------- | V | V | V | 0 | 1110 | 14 |
| 24 | -------- | V | V | V | V | 1111 | 15 |
| ------- | 17 | 0 | 0 | 0 | 0 | 0000 | 0 |
| ------- | 18 | 0 | 0 | 0 | V | 0001 | 1 |
| ------- | 19 | 0 | 0 | V | 0 | 0010 | 2 |
| ------- | 20 | 0 | 0 | V | V | 0011 | 3 |
| ------- | 21 | 0 | V | 0 | 0 | 0100 | 4 |
| ------- | 22 | 0 | V | 0 | V | 0101 | 5 |
| ------- | 23 | 0 | V | V | 0 | 0110 | 6 |
| ------- | 24 | 0 | V | V | V | 0111 | 7 |

When the code pattern has moved forward by such amount that all pickups sense the conducting segment 51, the binary number 1111 is represented by the outputs 40 to 43. Further movement releases relay 27′, causing all output terminals to change in potential and to represent the binary number 0000. Further forward motion releases relays 28′ to 34′ in order, producing the outputs shown in Table I.

The invention may be applied to any code pattern device employed in an analog-to-digital converter. For example, the invention may be applied to a code device employing the reflected binary code, the only other binary code in common use. A suitable relay circuit is required, and the pickup placement is effected in accordance with the foregoing description.

What is claimed is:

1. An analog-to-digital converter comprising, a code wheel inscribed with indicia of two kinds representing the natural binary digital code, said code wheel inscriptions being divided into at least one circumferential zone, said zone representing a selected binary place, a plurality of pickups associated only with and sensing only said selected zone, all of said pickups being immobile relative to each other, said pickups being spaced circumferentially by equal distances equalling $\frac{1}{2}^n$ of the length of one indicium in said selected zone where $n$ is an integer, each said pickup emitting a sense signal the value of which depends on the indicium sensed, input data means applying angular deflection to said code wheel analogous in angular measure to input data magnitude, said angular deflection application deflecting said code wheel angularly relative to said pickups, and relay means connected to said pickups for translating the sense signals thereof to parallel binary signals representing the value of said analog input data by binary digits in $n$ binary places less significant than said selected binary place.

2. An analog-to-digital converter comprising, a code wheel inscribed with natural binary digital indicia, means applying analog data to position said code wheel, a plurality of sensing means associated only with and sensing only a single zone of selected significance, a plurality of electromagnetic relays equal in number to the number of said sensing means, each relay having at least two contact arms, each contact arm having a front and a back contact, a connection from each sensing means to the winding of a respective one of said relays, a plurality of output terminals, a source of potential, and circuit means connecting said relay arms and contacts, said output terminals and said source of potential whereby all of the potential levels together at said output terminals represent a binary number having a value equal to said analog data value in binary places less significant than the place represented by said single zone.

References Cited by the Examiner

UNITED STATES PATENTS

| | | | |
|---|---|---|---|
| 2,630,562 | 3/53 | Johnson | 340—347 |
| 2,750,584 | 6/56 | Goldfischer | 340—347 |
| 2,873,440 | 2/59 | Speller | 340—347 |
| 2,898,040 | 8/59 | Steele | 340—347 |
| 2,975,409 | 3/61 | Petherick | 340—347 |

MALCOLM A. MORRISON, *Primary Examiner.*

WALTER W. BURNS, JR., IRVING L. SRAGOW, JOHN F. BURNS, *Examiner.*